(12) United States Patent
Singhal et al.

(10) Patent No.: US 7,200,690 B2
(45) Date of Patent: Apr. 3, 2007

(54) MEMORY ACCESS SYSTEM PROVIDING INCREASED THROUGHPUT RATES WHEN ACCESSING LARGE VOLUMES OF DATA BY DETERMINING WORSE CASE THROUGHPUT RATE DELAYS

(75) Inventors: Rakshit Singhal, Bangalore (IN); Anindya Saha, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 414 days.

(21) Appl. No.: 10/709,234

(22) Filed: Apr. 22, 2004

(65) Prior Publication Data

US 2004/0213054 A1  Oct. 28, 2004

Related U.S. Application Data

(60) Provisional application No. 60/466,230, filed on Apr. 28, 2003.

(51) Int. Cl.
*G06F 13/28* (2006.01)
*G06F 15/76* (2006.01)

(52) U.S. Cl. .................. 710/22; 710/23; 710/28; 710/29; 710/33; 710/34; 710/35; 711/100; 709/212; 709/400; 365/200; 365/201

(58) Field of Classification Search .................. 710/22, 710/29, 33–35, 23, 28; 365/200, 201; 711/212, 711/400

See application file for complete search history.

(56) References Cited

U.S. PATENT DOCUMENTS 6,678,777 B2 *   1/2004   Rao et al. .................... 710/305

OTHER PUBLICATIONS

Singhal, Rakshit et al.; A Novel Mechanism to Optimize Memory to Memory Data Transfers in a System-on-Chip Using Store and Forward Bridge and a DMA Engine; pp. 1-6.
Fact Sheet: AR7Wi Wireless ADSL Router; pp. 1-4; Texas Instruments Real World Signal Processing; 2004.
Parekhji, Nikita et al.; DFT For Test Optimisations in a Complex Mixed-Signal . . . ; 2004 IEEE ITC International Test Conference; pp. 773-782.

* cited by examiner

*Primary Examiner*—Tammara Peyton
(74) *Attorney, Agent, or Firm*—Steven A. Shaw; W. James Brady; Frederick J. Telecky, Jr.

(57) ABSTRACT

Enhancing the throughput rate of a memory access system by using store and forward buffers (SFB) in combination with a DMA engine. According to an aspect of the present invention, the worst case throughput rate (without use of SFBs) is computed, and maximization factor equaling a desired throughput rate divided by the worst case throughput rate is computed. A number of SFBs is determined as equaling one less than the maximization factor. By placing the SFBs at appropriate locations in the data transfer path, the desired throughput rate may be attained when transferring large volumes of data.

16 Claims, 3 Drawing Sheets

MEMORY ACCESS SYSTEM PROVIDING INCREASED THROUGHPUT RATES WHEN ACCESSING LARGE VOLUMES OF DATA BY DETERMINING WORSE CASE THROUGHPUT RATE DELAYS

CROSS REFERENCE TO RELATED APPLICATIONS

The present application is related to and claims priority from the co-pending U.S. Provisional Patent Application Ser. No.: 60/466,230, entitled, "A Novel Mechanism to Optimize Memory to Memory Data Transfer in a System-on-Chip Using Store and Forward Bridge and a DMA Engine", filed on Apr. 28, 2003, naming as inventors: Singhal et al, and is incorporated in its entirety herewith.

BACKGROUND OF INVENTION

1. Field of the Invention

The present invention relates to memory systems used in digital processing systems, and more specifically to a method and apparatus which enables a memory access system to provide increased throughput rates while accessing large volumes of data.

2. Related Art

Memory access systems are generally employed to access (store/retrieve) data in/from a memory. Large volumes (e.g., of the order of kilo or Mega-bytes) of data are often retrieved from memories. For example, software instructions may need to be retrieved from a large external memory to a smaller on-chip internal memory, prior to execution of the instructions. Such an approach enables operation using a faster (but smaller, and thus not-too expensive) on-chip memory, as is well known in the relevant arts.

One variable of interest while accessing such large volume of data is the throughput rate (number of bytes transferred per unit time) at which data transfer is performed. Often it is desirable that the throughput rates be high such that data transfer can be completed within a certain duration. For example, in the above noted illustrative example, the memories may be employed associated with real-time systems in which real-time data needs to be processed quickly by executing the software instructions, and lower throughput rates in transfer (of software instructions) may lead to software instructions not being timely available for execution. Several undesirable consequences such as loss of data and/or appropriate action not being taken in a timely manner, may result when the software instructions are not timely available.

One configuration in which enhancement of throughput rate is of particular interest is in which a memory access system contains several sub-delays in the data transfer path (with each sub-system potentially causing potentially large delays), and the data units (forming the large of data of interest) are retrieved and stored sequentially without pipelining (i.e., overlap on a time scale). The high delays may be introduced, for example, due to sharing of common resources. As an illustration, a single interface may be used associated with accessing multiple memories (or other sub-systems), and requests to all such memories may need to be channeled through that single interface.

Thus, high delays (and thus lower throughput rates) may be caused due to arbitration (determining which access gets priority), queuing (waiting while the present and/or higher priority accesses get served), etc., for a shared resource. The effective throughput rate in such a scenario is inversely proportional to the sum of the sub-delays. The throughput rate may be lower than a desired rate due to the high sub-delays. At least for reasons such as those noted above, it may be desirable to increase the throughput rate.

Several prior approaches are known to attempt to increase the throughput rate in a memory access system. In one prior approach, a processor (e.g., a central processing unit) may merely need to specify the specific block of data to be transferred from a source memory to a destination memory, and a direct memory access (DMA) engine may complete such transfer without requiring substantial additional intervention of the processor. The transfer may be completed quickly as the processor may not now be a bottleneck (in effecting the transfer). However, it may be desirable to further increase the data throughput rate.

BRIEF DESCRIPTION OF DRAWINGS

The present invention will be described with reference to the following accompanying drawings.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention increases data transfer throughput rate in accessing large volumes of data from a source memory by placing a direct memory access (DMA) engine and store-and-forward bridges (SFB) in that sequence in a data transfer path from the source memory. In an embodiment, a determination is made as to the (integer) factor by which the throughput rate is to be increased, and a number of SFBs equal to one less than such factor are employed. For example, two SFBs are employed if the worst case data throughput is sought to be increased by thrice (of the worst case data throughput from the source to the destination), and four SFBs are employed if the throughput rate is sought to be increased by five times.

The SFBs are sought to be positioned such that equal aggregate maximum delays would be encountered in each segment of the path formed from the source to the destination by the SFBs. For example, in the case of four SFBs, the maximum delay in each segment (three segments between the four SFBs, and the remaining two at either end) equals ⅕ the maximum possible delay in the entire path from the source to the destination memory. The throughput rate may be enhanced by the desired factor as a result.

The SFB further provides control signals indicating whether the DMA engine can continue sending additional data (e.g., when additional space is available in the buffer), and thus provides a flow-control mechanism on the side of the source memory. The SFB may further contain a control FIFO, which enables the SFB to store any portion of the buffered data at desired location(s) in the destination memory at any time as permitted by the components in the path further down the data transfer path. Due to the use of such an SFB, the throughput rate in accessing large volumes of data may be increased.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

2. Example Environment

Figure 1A:
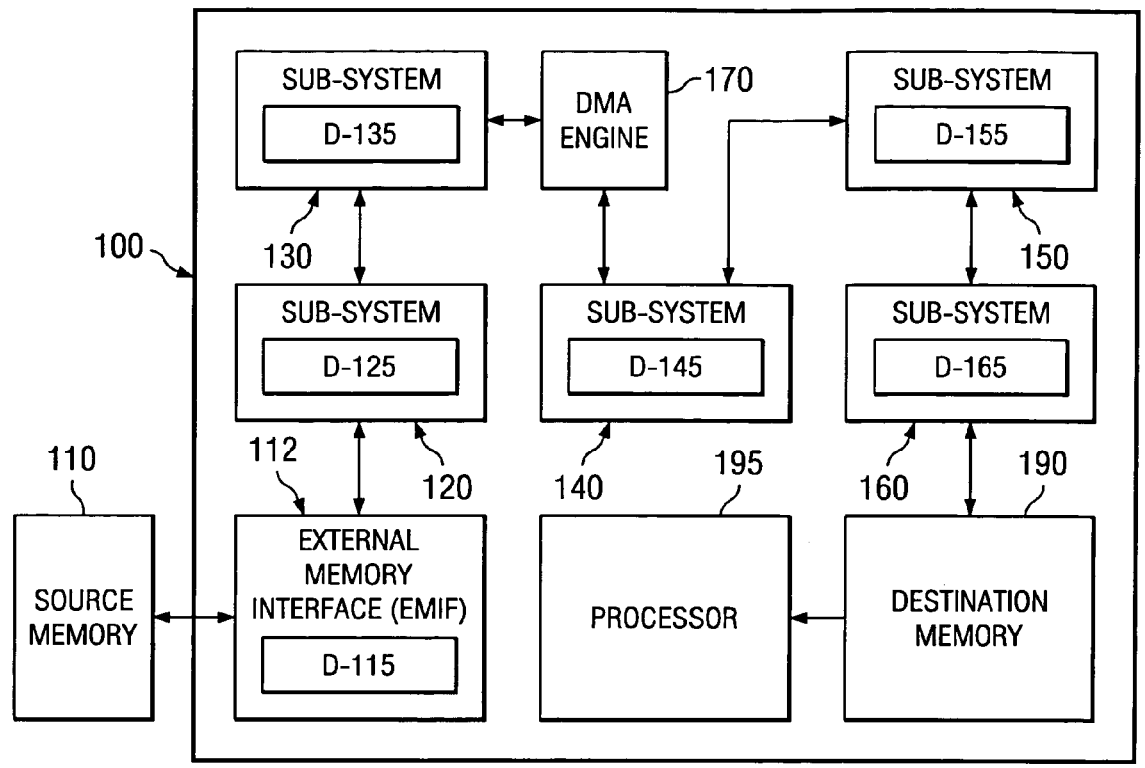
FIG. 1A is block diagram of an example environment in which the present invention can be implemented.

FIG. 1A is a block diagram illustrating the details of an example environment in which the present invention can be implemented. Example environment is shown containing source memory 110, external memory interface (EMIF) 112, sub-systems 120, 130, 140, 150 and 160, direct memory access (DMA) engine 170, destination memory 190, and processor 195. Each block of FIG. 1 is described below in further detail.

The environment is shown containing a few representative components only for illustration. In reality, each environment typically contains many more components. For example, system 100 (containing all the components of FIG. 1A except source memory 110) may contain many more sub-systems, but only the sub-systems in the data transfer path are shown for conciseness. In addition, system 100 may correspond to a system on a chip. However, various aspects of the present invention can be implemented in other types of systems as well.

Source memory 110 is assumed to contain a large amount of data, at least a portion of which needs to be transferred to destination memory 190. The portion may contain software instructions which are to be transferred (e.g., for paging/swapping) to destination memory 190, possibly for immediate execution by processor 195. Destination memory 190 is shown as a separate block, but may be integrated into one of the sub-systems. In general, destination memory 190 represents a destination to which the retrieved data is transferred. Other types of destinations may be employed as appropriate for a specific situation.

EMIF 112 contains several pins (not shown) to provide an appropriate interface between source memory 110 and sub-system 120. Often a single EMIF is provided on system-on-a-chip type of environments typically due to the high cost associated with the large pin count. As several sub-systems share the EMIF, a large amount of maximum (or worst-case) delay (D-115) may be presented by EMIF 112 when data is sought to be retrieved from source memory 110.

Sub-systems 120, 130, 140, 150 and 160 are respectively assumed to introduce a maximum delay of D-125, D-135, D-145, D-155 and D-165 when data is transferred from source memory 110 to destination memory 190. The delays may be introduced, for example, as shared buses are used by each sub-systems for accessing various resources (including source memory 110). Each sub-system may contain one or more processing elements (not shown), and thus operate independently or in a master-slave relationship.

DMA engine 170 retrieves a sequence of data bytes/elements from source memory 110 after being configured with data indicating specific bytes (e.g., start address and number of bytes) that need to be retrieved. Once DMA is initiated, DMA engine 170 transfers data in single or multiple bursts from source memory 110 to destination memory 190. Transfer of data may be performed as a combination of reading data from source memory 110 and writing data to destination memory 190. The read and write operations may be performed sequentially (with limited internal buffering) for each data unit. The read-write sequence is repeated until the specified size of data is transferred to destination memory 190.

The worst case throughput rate is inversely proportionate to the sum of maximum delays D-115, D-125, D-135, D-145, D-155 and D-165 present in the path of data transfer between source memory 110 and destination memory 190. The data transfer is performed without the intervention of the processor, which otherwise would be a bottle neck in transferring data between two memories. However, in real time scenarios worst case data throughput may need to be increased to transfer data quickly such that a processor operating based on the contents of destination memory may operate without causing undesired results.

The description is continued with reference to the manner in which the throughput rate can be increased. The manner in which the rate can be increased to a desired degree is then described with reference to FIG. 2.

Figure 1B:
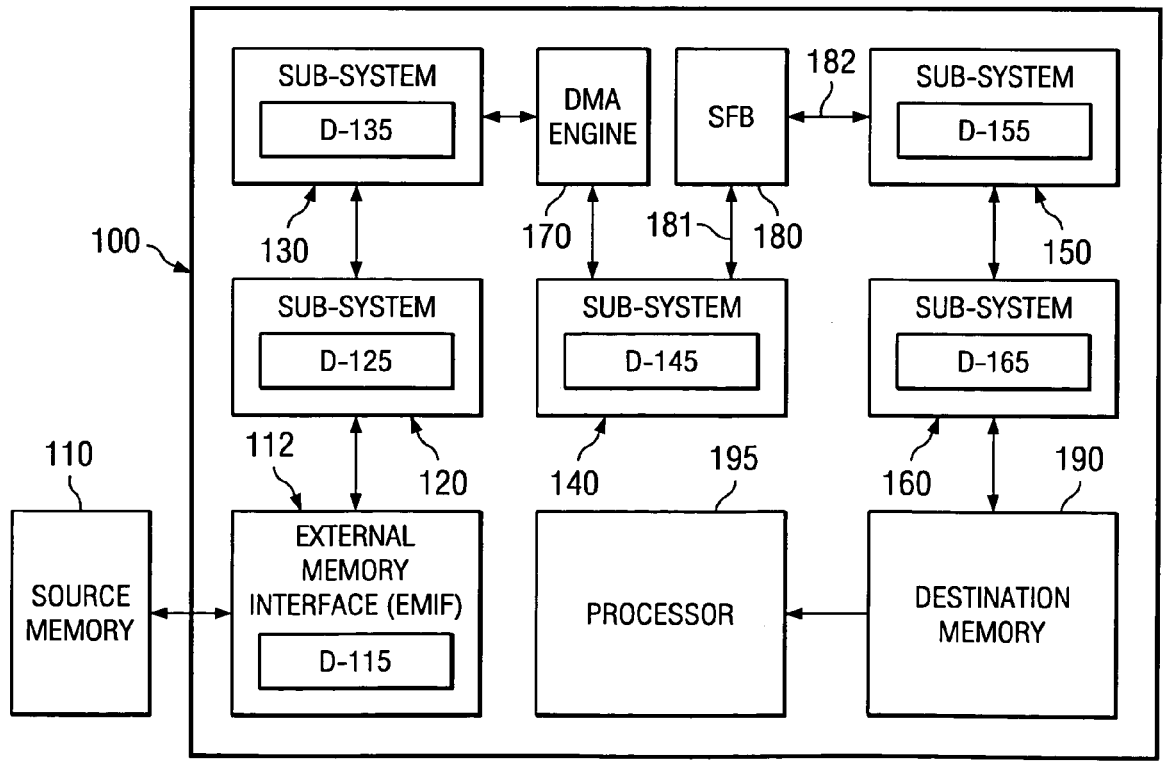
FIG. 1B is a block diagram illustrating the manner in which the data throughput rate can be increased according to an aspect of the present invention.

FIG. 1B is a block diagram illustrating the manner in which the data throughput rate can be increased according to an aspect of the present invention. Only, the differences in FIG. 1B as compared to FIG. 1A are described for conciseness. The block diagram of FIG. 1B is shown to be same as block diagram of FIG. 1with an additional block SFB 180 included in system 100.

DMA engine 170 is configured (as described above) to initiate data transfer. Once DMA is initiated, DMA engine 170 transfers data in single or multiple bursts from source memory 110 to SFB 180. Transfer of data may be performed as a combination of reading data from source memory and writing data to SFB 180. The read and write operations may be performed sequentially (with limited internal buffering) for each data unit. The read-write sequence is repeated until the specified size of data is transferred to destination memory 190.

SFB 180 contains at least two data ports, with one port (corresponding to path 181) being used to receive data units, and another port (corresponding to path 182) being used to forward/store the data units. Each data unit may be buffered within SFB 180, until the path to destination memory 190 is available for storing. SFB 180 provides control signals (e.g., an acknowledgment of ability to receive a data unit in response to a request received from DMA) indicating whether the DMA engine 170 can continue sending additional data, and thus provides a flow-control mechanism on the side of the source memory. SFB 180 may in turn sends requests to sub-system 150 requesting whether a buffered data unit can be forwarded for storing in destination memory 190.

As may be readily appreciated, due to the overlap of data transfers to the SFB 180, and from the SFB 180 to destination memory 190, the worst case data throughput of the entire data transfer may be increased. In addition, by providing the SFB after the DMA engine in the data transfer path, the DMA capabilities (in terms of independently-desired sequence of data elements from source memory 110) can be adequately utilized.

However, the extent of increase in the worst case data throughput may depend on the position of SFB 180 as described below with reference to FIG. 2. Further increase in the throughput rate may be attained by using more SFBs as also described with reference to FIGS. 3A–3C in sections below.

3. Method

Figure 2:
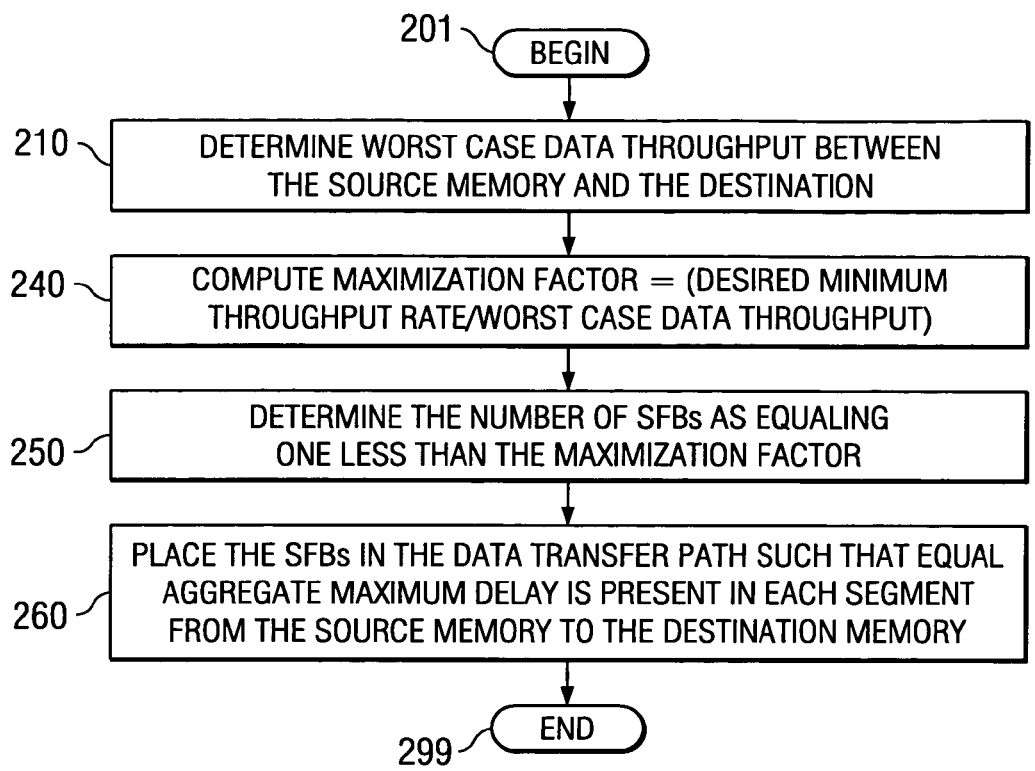
FIG. 2 is a flow-chart illustrating the details of a method using which a desired throughput rate can be attained while accessing data in a memory.

FIG. 2 is a flow-chart illustrating the details of a method using which at least a desired minimum throughput rate can be attained according to an aspect of present invention. The method is described with reference to system 100 of FIG. 1 merely for illustration. However, the method may be implemented to operate memory access systems in other environments as well. The method begins in step 201, in which control immediately passes to step 210.

In step 210, worst case data throughput between the source memory and the destination memory may be determined. In the embodiments of FIG. 1A, minimum possible throughput rate is inversely proportionate to the sum of individual worst case delays associated with each sub-system in the data transfer path between two memories.

In step 240, a maximization factor is computed by dividing a desired minimum throughput rate by the worst case data throughput. The desired minimum throughput rate may be specified by a user/designer of system 100. In an embodiment implemented in the context of DSL environment, 32 Kb (kilobytes) of data may need to be transferred within 1 ms (millisecond).

In step 250, the number of SFBs required is determined as equaling one less than the maximization factor. For example, assuming the maximization factor equals five, four SFBs may be required.

In step 260, the SFBs are placed in the data transfer path such that substantially equal aggregate maximum delay (causing equal minimum throughput rate)is present in each segment. That is, the data transfer path from source memory 110 to destination memory 190 may be viewed as being divided into (N+1) segments by using N SFBs. The location of the SFBs is determined such that the minimum throughput rate in each segment is approximately the same.

As described in sections below, such use of SFBs at the corresponding locations causes the worst case data throughput to be increased to at least the desired minimum throughput rate. The method ends in step 299. The description is continued with reference to examples which further illustrate such increase.

4. Examples

Figure 3A:
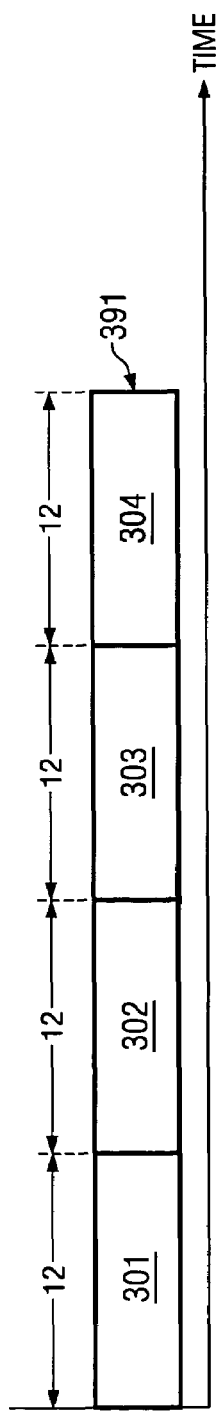
FIG. 3A is a timing diagram illustrating the throughput rate in an example prior scenario in which store and forward buffers (SFB) are not employed in a data transfer path.
Figure 3B:
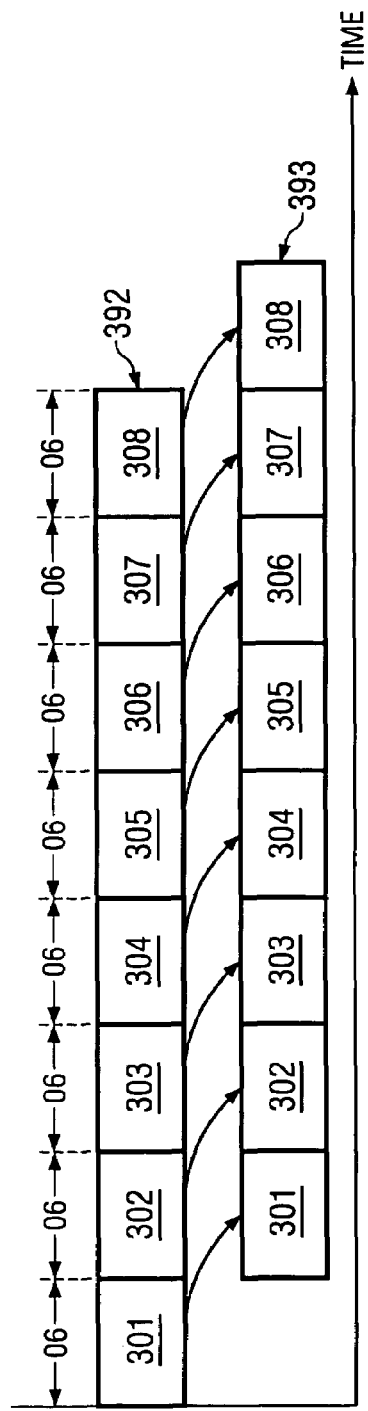
FIG. 3B is a timing diagram illustrating the manner in the throughput rate is doubled by use of a SFB at an appropriate place of the data transfer path according to an aspect of the present invention.
Figure 3C:
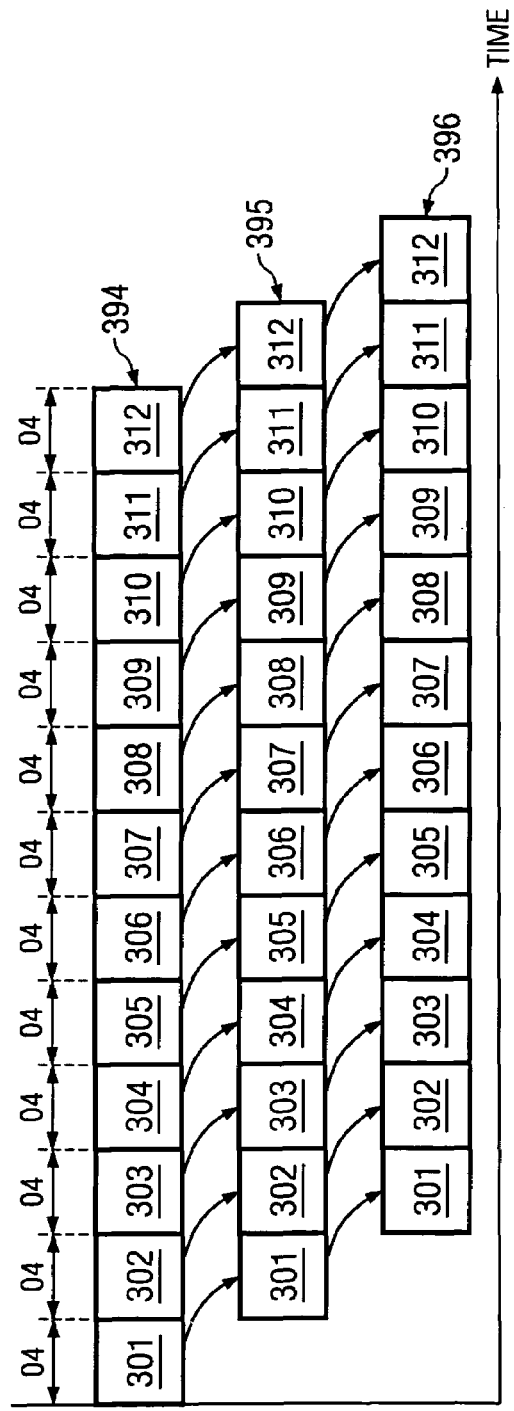
FIG. 3C is a timing diagram illustrating the manner in the throughput rate is further enhanced by the use of two SFBs at appropriate places of the data transfer path according to an aspect of the present invention.

Broadly, the first example with reference to FIG. 3A illustrates the worst case data throughput rate without using any SFBs. The second example with reference to FIG. 3B illustrates that the data throughput rate is doubled by using a single SFB at the appropriate location. The third example of FIG. 3C illustrates that the data throughput rate is three times that of FIG. 3A by using two SFBs. In all the examples, it is assumed that individual worst-case delays D-115, D-125, D-135, D-145, D-155, D-165, are respectively equal to 3, 1, 1, 1, 2, and 4 time units.

FIG. 3A is a timing diagram corresponding to the operation of FIG. 1A (in which no SFBs are used).total worst case delay equals 12 units (3+1+1+1+2+4). Due to the limited buffering capability within DMA engine 170 and sequencing of the read/write operations, the throughput rate is one data burst per 12 time units in the steady state (as may be readily observed by examining the time durations shown associated with each data unit in row 391).

FIG. 3B is a timing diagram corresponding to the operation of FIG. 1B, in which SFB 180 is placed at the half delay (of the total delay from source memory 110 to destination memory 190) point. As may be readily observed from row 392, DMA 170 transfers each data burst in 6 time units to SFB 180. In the next 6 time units, SFB 180 transfers the data burst to destination memory 190 (as shown by row 393), while DMA 170 transfers the next data burst into SFB 180. Due to the overlap, the worst case data throughput equals one data burst per 6 time units in the steady state.

FIG. 3C is a timing diagram corresponding to a situation in which two SFBs are employed at ⅓ and ⅔ delay points. In such a scenario, a two level pipeline is in operation, with DMA 170 transferring each data burst in 4 time units to the first SFB (as shown by row 394). Due to the equal delays in each segment, in the same time duration (4 time units), a corresponding data burst is transferred from the first SFB to the second SFB (as shown by row 395), and from the second SFB to destination memory 190 (as shown by row 396). Thus, due to the overlap in the transfers, the worst case data throughput equals one burst per 4 time units in the steady state (attaining a throughput rate improvement by a factor of 3 by using two SFBs).

According to an aspect of the present invention, the SFBs are all positioned between DMA engine 170 and the destination (destination memory 190), as also depicted in FIG. 1B. By having the SFBs in the path after the DMA read operations, DMA engine 170 is quickly freed of the writing task (into destination memory 190), and the next burst of data may be accordingly retrieved. It may be further appreciated that DMA engine 170 needs to be located in a first segment in the path from the source memory to the destination.

Thus, using the approaches described above, the throughput rate can be increased to a desired degree. The description is continued with reference to the details of an embodiment of store forward bridge (SFB).

5. Store Forward Bridge (SFB)

Figure 4:
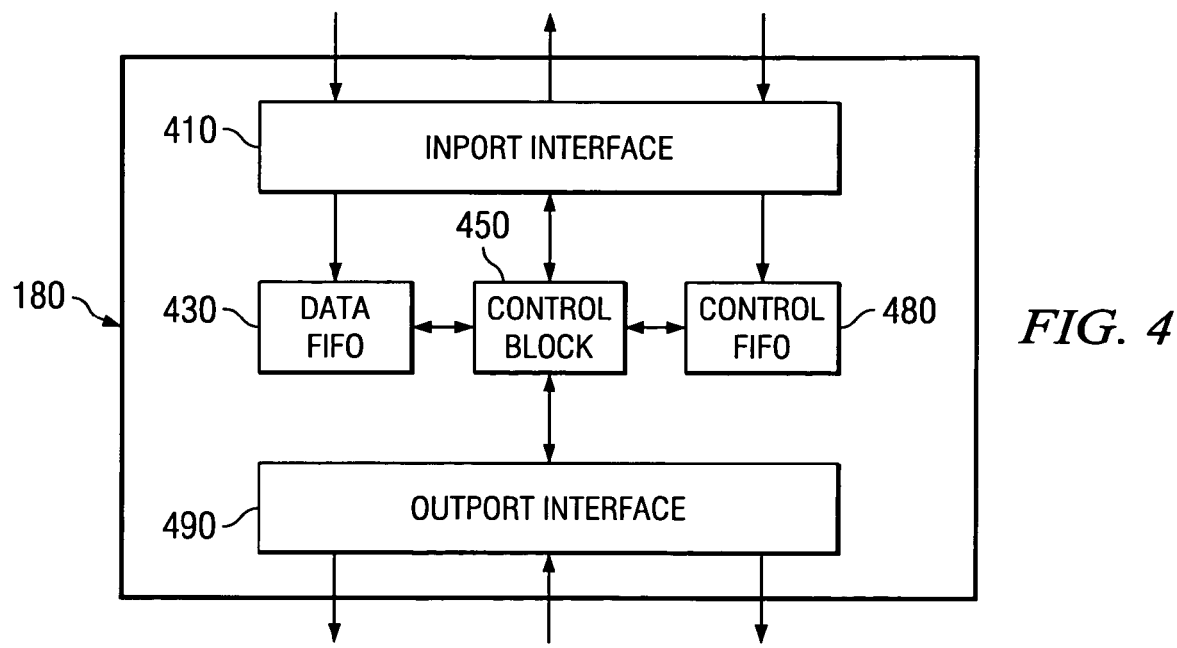
FIG. 4 is a block diagram illustrating details of an embodiment of SFB.

FIG. 4 is a block diagram illustrating the details of an embodiment of SFB 180. SFB 180 is shown containing inport interface 410, data FIFO 430, control block 450, control FIFO 480, and outport interface 490. Each block is described in detail below.

Inport interface 410 provides physical, electrical and protocol interface to receive various types of data from DMA 170. The data portion (sought to be transferred downstream) may be passed to data FIFO 430, and control and address related data is passed to control FIFO 480. Similarly, outport interface 490 provides physical, electrical and protocol interface to send/ receive types of data to/from destination memory 190. The types of data sent and received are described below in further detail.

Data FIFO 430 provides a memory to store the burst of data (requested data) received from DMA 170 via inport interface 410. The stored data is transferred in a FIFO fashion to destination memory 190 under the control of control block 450. Control FIFO 480 stores control information (such as destination address, byte enables etc., if required) for SFB to complete the transaction (storing to destination memory). The FIFOs can be implemented using several approaches well known in the relevant arts.

Control block 450 coordinates and controls the operation of the other components in SFB 180. For example, control block 450 uses output interface 490 to transfer data stored in data FIFO 430, for eventual storing at addresses specified by the control data in control FIFO 480. Control block 450 may send an acknowledgment (for the transferred data) when such transfer is complete and when SFB 180 is ready to receive additional data. In general, when sufficient storage is present in data FIFO 430, SFB 180 may be considered to be ready to receive additional data.

After receiving an acknowledgment from outbound interface 490 in relation to previously transferred data, control block 450 may remove the corresponding data and control information from FIFOs 430 and 480 respectively. Such removal frees up entries in the FIFOs, thereby making SFB 180 ready to receive additional data.

Thus, by using SFBs according to the approaches described above, the throughput rate of a memory access system may be enhanced. Multiple SFBs can be used to attain a desired minimum throughput rate as also described above.

6. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A method of transferring a large volume of data from a source memory to a destination at a desired throughput rate, said method being implemented in a memory access system, said memory access system containing a plurality of sub-systems, each of said plurality of sub-systems providing a corresponding one of a plurality of worst-case delays, said method comprising:
   determining a worst case throughput rate as being inversely proportionate to a sum of said plurality of worst-case delays;
   determining a maximization factor as equaling a desired throughput rate divided by said worst case throughput rate;
   providing a direct memory access (DMA) engine coupled to retrieve said large volume of data in the form of a plurality of bursts; and
   providing a number of store and forward bridges (SFB) equaling one less than said maximization factor, wherein said SFBs receive said plurality of bursts and forward said plurality of bursts to said destination.

2. The method of claim 1, wherein said SFBs are provided between said DMA and said destination.

3. The method of claim 2, wherein one more than said number of segments are formed in a data transfer path from said source memory to said destination, said SFBs being placed such that the sub-systems contained in each of said segments provides an approximately equal aggregate maximum delay.

4. The method of claim 3, wherein said destination comprises a destination memory.

5. The method of claim 4, wherein each of said SFBs contains a plurality of ports for reading and writing said large volume of data in parallel.

6. A memory access system transferring a large volume of data from a source memory to a destination at a desired throughput rate, said memory access system comprising:
   a plurality of sub-systems, each of said plurality of sub-systems providing a corresponding one of a plurality of worst-case delays;
   a direct memory access (DMA) engine coupled to retrieve a portion of said data in the form of a plurality of bursts; and
   a number of store and forward bridges (SFB) receiving each of said plurality of bursts and forwarding said plurality of bursts to said destination, wherein said number is determined by dividing said desired throughput rate by a worst case throughput rate, wherein said worst case throughput rate is inversely proportional to a sum of said plurality of worst-case delays.

7. The memory access system of claim 6, wherein said SFBs are provided between said DMA and said destination.

8. The memory access system of claim 7, wherein one more than said number of segments are formed in a data transfer path from said source memory to said destination, said SFBs being placed such that the sub-systems contained in each of said segments provides an approximately equal aggregate maximum delay.

9. The memory access system of claim 8, wherein said destination comprises a destination memory.

10. The memory access system of claim 9, wherein each of said SFBs contains a plurality of ports for reading and writing said large volume of data in parallel.

11. The memory access system of claim 7, wherein said number equals 1.

12. The memory access system of claim 7, wherein said plurality of sub-systems and said destination memory are contained in a system-on-a-chip, and wherein said source memory is located external to said system-on-a-chip.

13. The memory access system of claim 12, wherein said plurality of data bursts comprise a plurality of software instructions which are to be executed by a processor contained in said system-on-a-chip.

14. The memory access system of claim 7, wherein each of said SFB comprises:
   an inport interface receiving a first burst of data and an address at which to store said first burst of data;
   a data FIFO storing said first burst of data;
   a control FIFO storing said address;
   an outport interface;
   a control block transferring said first burst of data on said outport interface to said destination.

15. The memory access system of claim 14, wherein said control block sends an acknowledgment on said inport interface upon storing said first burst of data and said address.

16. The memory access system of claim 14, wherein said control block receives an acknowledgment after transferring said first burst of data, and removes said first burst of data from said data FIFO and said address from said control FIFO in response to receiving said acknowledgment.

* * * * *